May 6, 1958 D. B. ROSSHEIM ET AL 2,833,631
LINED REACTOR VESSEL
Filed May 17, 1954 2 Sheets—Sheet 2
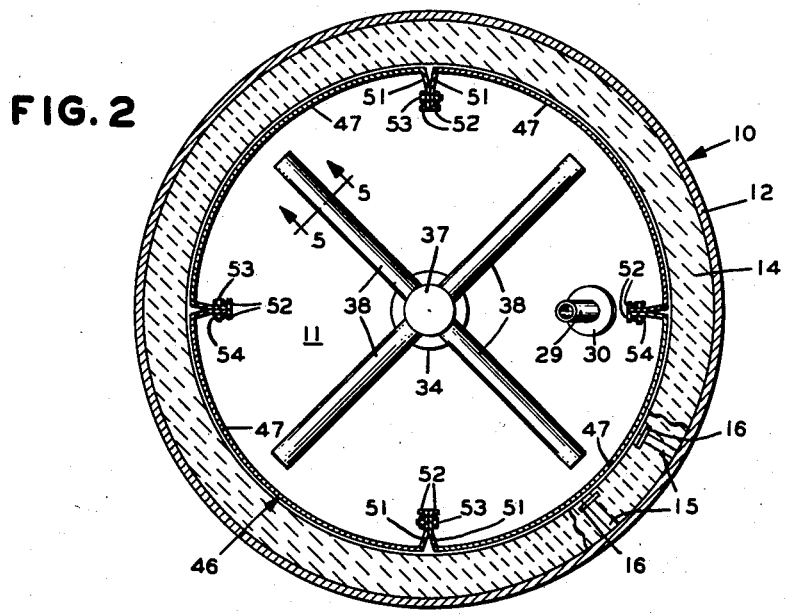
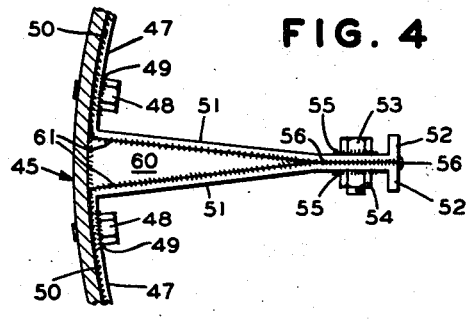
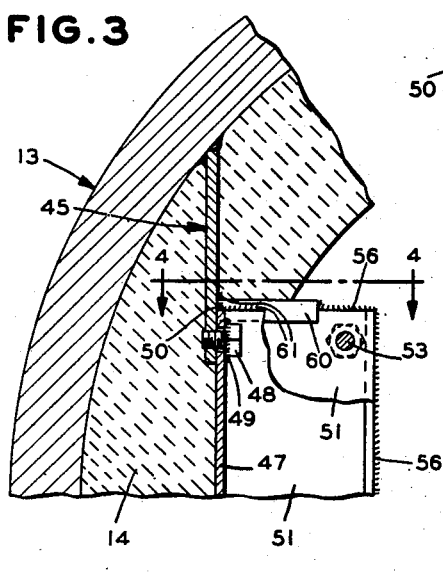
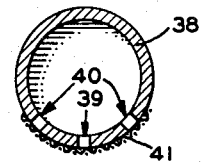
INVENTORS
DAVID B. ROSSHEIM
VICTOR K. TOCK
BY
G. H. Palmer
V. F. Davis
ATTORNEYS

2,833,631
LINED REACTOR VESSEL

David B. Rossheim, Teaneck, and Victor K. Tock, River Edge, N. J., assignors to The M. W. Kellogg Company, Jersey City, N. J., a corporation of Delaware Application May 17, 1954, Serial No. 430,108

1 Claim. (Cl. 23—288)

This invention relates to vessels employed in carrying out catalytic reactions and particularly to reactor vessels adapted to house catalytic beds of low resistance to the flow of reactant materials therethrough.

It is highly important for high operating efficiency to be realized in catalytic processes that the entire catalyst bed be utilized to a high degree and that substantially all increments of the reactants be subjected to substantially the same conditions for substantially the same time interval while in contact with the catalyst. To achieve this end it is necessary that the whole reactant stream pass through the whole of the catalyst bed and that none of the reactant flow bypass the catalyst. If the latter occurs, the desired reactions will not go forward to the extent desired and the catalyst bed will not be effectively employed. Furthermore, bypassing of catalyst generally results in the channeling of substantial proportions of the reactants into one or more confined high velocity streams of high erosion potential. The reactor vessels commonly employed for housing the catalyst bed are generally internally lined with a depth of refractory material to protect the walls thereof from the effects of high reaction temperatures. Hence, if channeling occurs at or adjacent the refractory lining of the reactor vessel, said lining will rapidly be eroded out and substantial, if not major, proportions of the reactants will flow through the lining space and completely bypass the catalyst bed. This condition not only results in greatly lowered operational efficiency but also in greatly increased costs due to the increased maintenance, repair and replacement burdens. The reactant distribution and channeling problem is especially acute in connection with catalyst beds of comparatively low flow resistance. Such beds are comparatively shallow relative to their sectional area so that they do not inherently tend to provide for at least a degree of automatic flow distribution in the bed.

It is a principal object of this invention to provide a catalytic reactor vessel which includes an internal refractory lining and is so constructed and arranged that the flow of the reactant material through the internal refractory lining is effectively prevented.

It is a further principal object of this invention to provide a catalytic reactor vessel having a refractory lining applied to the internal wall thereof and adapted to support a bed of catalyst therein in which sealing arrangements are provided which seal the lining space to the flow of the reactant material therethrough and restrict said flow to the cross section thereof normally occupied by the catalyst bed.

It is a still further important object of this invention to provide a catalytic reactor vessel having a refractory lining applied to the internal wall thereof which includes a flow impervious structure surrounding the space normally occupied by the catalyst bed and united to a flow impervious baffle positioned across said lining adjacent the reactant material inlet to said reactor, to the end that the reactant material introduced into said reactor can only flow through the space encompassed by said structure and cannot flow through space occupied by the lining.

The further objects, features, and advantages of the invention will become apparent from a consideration of the following detailed description taken with the accompanying drawings in which:

Fig. 2 is a sectional view taken on line 2—2 of Fig. 1;

Fig. 3 is a fragmentary sectional view showing a portion of the structure of Fig. 1 on an enlarged scale and to a greater degree of particularity;

Fig. 4 is a sectional view taken on line 4—4 of Fig. 3; and

Fig. 5 is a sectional view taken on line 5—5 of Fig. 2.

Figure 1:
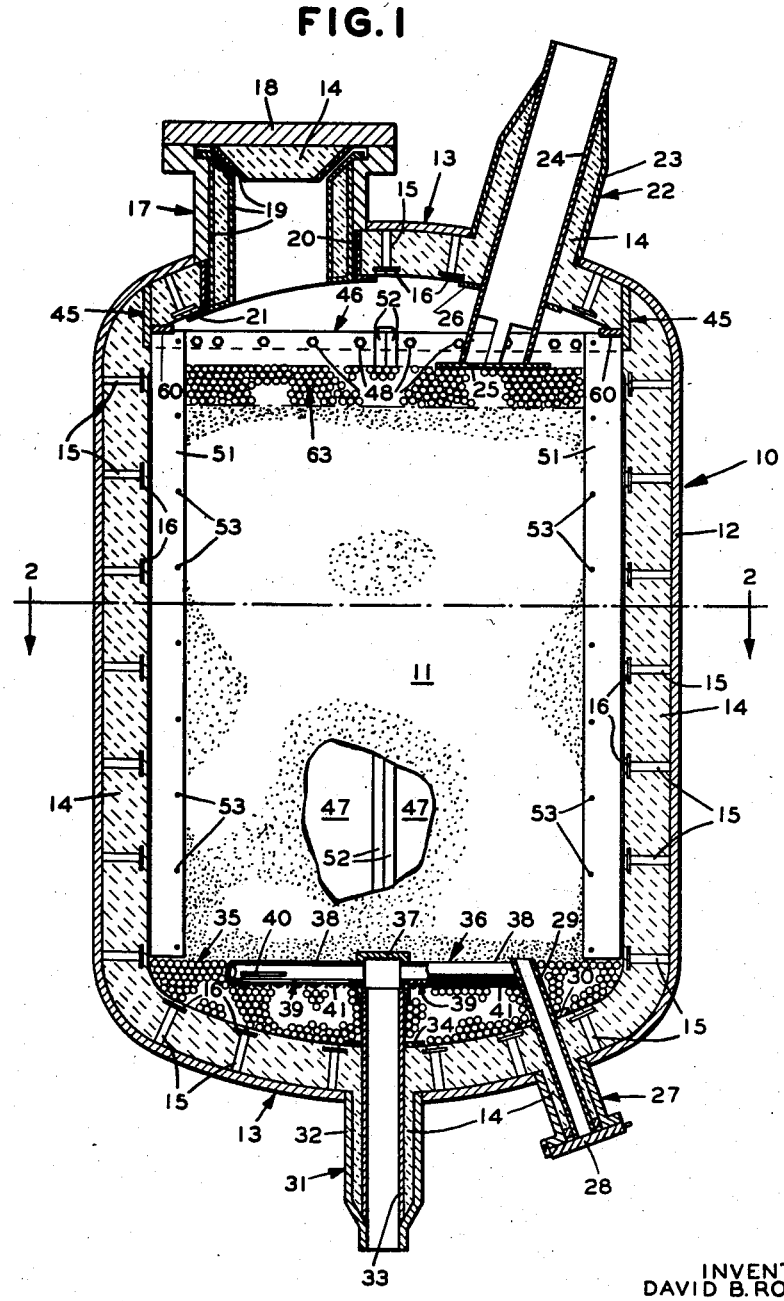
Fig. 1 is a vertical section through a reactor vessel embodying a presently preferred form of the invention.

The reactor 10 is conveniently a cylindrical vessel formed of a cylindrical body section 12 whose ends are closed by the top and bottom dished heads 13. The internal space of the vessel 10 defines the reaction zone and houses the catalyst bed 11. The reactor 10 is provided with an internal lining 14 of refractory insulation material which covers substantially the whole of the internal surface thereof. The material of lining 14 is preferably a settable, refractory, high temperature cement and is applied in the conventional manner by means of a conventional pneumatic spray "gun" arrangement. As an aid in depositing a refractory lining 14 of substantially uniform predetermined thickness and in holding the lining 14 in position after it is deposited, the bolts 15 and washers 16 are provided over the whole internal surface of the reactor 10. The bolts 15 are of substantially uniform length and are welded to the wall of the reactor 10 and to the washers 16 which are preferably made of corrosion resistant alloy. The surface of the lining 14 may be flush with the surface of the washers 16 but when the composition of the washers 16 is such that contamination of the catalyst is a possibility, the lining 14 is of a sufficient thickness to cover the washers 16 as shown.

A manway 17 is provided in the upper head 13 to afford entrance into the reactor 10 for assembly and maintenance of the internal structure thereof and introduction thereinto of the catalyst bed 11. The manway 17 is normally closed by a cover 18 which is bolted or otherwise removably united thereto. The manway 17 and the cover 18 are also internally lined with the refractory lining 14. Thin alloy members 19 are employed to hold the refractory lining 14 of the manway 17 and its cover 18 in position and to protect said lining 14. A thin alloy sleeve 20 is united to the manway 17 and covers the side of the hole in the main lining 14 through which the lining 14 or the manway 17 extends. The lining 14 around this hole is further reinforced and protected by the washer ring 21 which surrounds the inside end of the sleeve 20 and is united thereto. The top head 13 also includes an entrance nozzle 22 through which the reactant material is introduced into the reaction zone. The nozzle 22 includes an outer section 23 and an inner alloy section 24. The outer section 23 has a cylindrical lower portion which is attached, as by welding, to the periphery of the hole in the wall of the upper head 13 and a frustoconical portion whose smaller end is welded to the tubular inner section 24. The inner section 24 extends inwardly of the reactor 10. The inner end of the inner section 24 is castellated and has united thereto an alloy distributor baffle 25. By this arrangement the entering reactant materials are distributed substantially uniformly over the whole cross section of the reactor 10 and do not impinge on a restricted area of the catalyst bed 11. The annular space between the sections 23 and 24 is filled with insulation material 14. The inner section 24 also carries an alloy ring washer 26 united thereto which bears against the surface of the insulation material 14 adjacent the opening in the wall of the head 13 and serves to reinforce said insulation material and to give to the inlet nozzle 22 the required stability and rigidity. The construction is such that if due to wear, whether corrosive or erosive, of the inner section 24 and the distributor baffle 25, or either of them, said section 24 and the distributor 25 may be easily removed and replaced.

The bottom head 13 has a plurality of unloading connections 27 extending therefrom through which the catalyst of the bed 11 may be removed from the reactor 10, only one connection 27 is shown. The unloading connection or nozzle 27 is normally closed by a cover 28 which is shown as hinged thereto but may be removably united thereto in any preferred manner. The catalyst unloading nozzle 27 includes an internal alloy lining sleeve 29 spaced therefrom to provide an annular space for the accommodation of refractory insulation lining material 14. The inner end of the sleeve 29 extends inwardly into the reactor 10 to the bottom level of the catalyst therein which in the embodiment of the invention shown is at the tangent line of the cylindrical body section 12 and the bottom head 13. The ring washer 30 is united to the sleeve 29 and bears on the surface of the lining 14. The ring washer 30 serves to give the necessary stability and rigidity to the sleeve 29. A reactant material outlet connection 31 extends from the center of the bottom head 13. The connection 31 includes an outer section 32 made up of a cylindrical portion which is united to the bottom head 13 and a frusto-conical portion whose smaller end is united to the inner tubular section 33 which is made of a suitable resistant alloy. The annular space between the sections 32 and 33 is filled with refractory lining material 14. The inner section 33 extends into the reactor 10 to a level somewhat below the bottom level of the catalyst bed 11. A ring washer 34 is united to the inner section 33 and bears on the lining 14 to give strength and rigidity to the outlet connection 31. The space of the reactor 10 below the level of the bottom of the catalyst bed 11, the tangent line of body section 12 and bottom head 13, is filled with inert material 35, as for instance, alumina or Alundum in coarsely subdivided form, to assure a proper separation of the reacted materials from the catalyst of the bed 11. It is at present preferred to employ Alundum balls as the inert material 35, the Alundum balls being graded with the larger balls at the bottom and the smaller balls at the top. The grading in size ranges from about 1/8" diameter balls to about 1" diameter balls. Resting on the inert material 35 and with its top at the level of the inert material 35 is an alloy spider arrangement 36 through which the reacted material is collected for passage through the outlet connection 31. The spider arrangement 36 includes a central dome-like hub 37 which, as shown, is formed of a cylindrical body portion whose upper end is closed by a disc welded thereto. The cylindrical body portion of the hub 37 telescopes over the upper end of the inner section 33 of the outlet connection 31 with a slip fit, it not being necessary to exclude the flow of the reactants through the space between the bottom of the hub 37 and the top of the inner section 33. Extending radially outward from the hub 37 is a plurality of tubular collection arms 38 for the collection of the reacted material and the conducting thereof to the hub 37 for passage to the outlet connection 31. In the present preferred embodiment of the invention four arms 38 spaced 90° apart are provided. Each tubular arm 38 has its outer end closed by a suitable disc welded thereto and its inner end open and telescoping within an appropriate hole in the hub 37 and united thereto, as by welding. Each arm 38 has an elongated bottom slot 39 extending the full length thereof. Each of said arms is also provided with two slots 40 which extend for substantially the outer half of the arms 38. The slots 39 and 40 are radially spaced apart, as for instance by a 45° spacing and are proportioned to assure a substantially uniform collection capacity along the full length of the arms 38, bearing in mind the circular cross section of the reactor 10. A sufficient portion of the lower external surface of each of the arms 38 is covered by a wire cloth 41 to cover the slots 39 and 40. The wire cloth 41 is of such mesh as to prevent the passage of catalyst entrained in the exiting reacted material into the arms 38 without opposing substantial resistance to the flow of reacted material. If preferred a plurality of superposed graded layers of wire cloth 41 may be employed.

Attached to the upper head 13 and somewhat above the upper tangent line of the reactor 10 is a ring 45. The ring 45 is preferably attached to the top head 13 by welding and care is taken to assure a gas tight seal throughout. A shroud or lining 46 formed of a plurality of similar thin alloy sections 47, four being employed in the preferred embodiment of the invention shown, are secured at their upper ends to the ring 45 by means of a plurality of spaced bolts 48 which are threaded in appropriate spaced holes in the ring 45. To assure an impervious barrier the joints between the heads of the bolts 48 and the liner sections 47 are sealed by fillet welds 49. For the same purpose the top edges of the liner sections 47 and ring 45 are sealed by fillet welds 50. The sections 47 are formed of light gauge alloy material of an analysis proper to withstand the corrosive effects of the materials handled in the reactor 10 and such as not to contaminate the catalyst of the bed 11. The sections 47 as shown are shaped majorly as sections of a circle with the end portions 51 thereof bent inwardly and terminating in a flange 52. The inner ends of adjacent portions 51 are bolted together along their lengths by means of spaced bolts 53 and the nuts 54. The joints between the heads of the bolts 53 and the end portions 52 as well as the joints between the nuts 54 and the end portions 51 are sealed by depositing fillet welds 55. The joint between the shanks of the bolts 53 and the nuts 54 are likewise sealed by depositing fillet welds 55. The joint between the abutted flanged ends of the adjacent end portions 51 are likewise sealed by depositing weld metal 56 therealong.

The arrangement described provides an opening at the top and an opening at the bottom in the shroud 46 at each pair of juxtaposed end sections 51. Each of these top openings is closed by placing therein a triangular shaped blanking plate 60 which as shown extends in part above and in part below the upper edge of the sections 47. The joints between the blanking plate 60 and the upper edges of the end portions 51 and between the blanking plate 60 and the ring 45 are also sealed by the deposition of fillet welds 61. The lining shroud 46 extends downwardly in the reactor 10 to the bottom of the catalyst bed 11, that is to the tangent line of the bottom head 13 and the cylindrical body section 12. The lining 46 is formed of light material, for instance in the order of 16 gauge sheet metal, so that it may freely expand and contract with temperature changes without setting up stresses that would tend to rupture it or so distort it as to permit flow between it and the outer wall of the reactor 10. The light gauge metal furthermore assures against leakage due to distortion or rupture at the upper end of the liner 46 since it may easily be restrained by the much heavier and stronger ring 45.

The catalyst bed 11 as stated has its bottom at approximately the level of the bottom tangent line of the reactor 10 and extends upwardly to a level somewhat below the upper tangent line to accommodate a covering bed 63 of inert material of the same or similar character as the material 35. It is at present preferred to form the bed 63 of Alundum balls of about 1" diameter.

The catalyst bed 11 may be made of any material suitable for carrying out the desired reaction and may be of any preferred particle size. By way of example and not limitation, when reforming light hydrocarbon oil, for instance when reforming a naphtha of about 52° A. P. I. gravity, and 30 C. F. R. R. clear octane rating and having an I. B. P. of about 185° F. and an E. P. (A. S. T. M. distillation) of about 390° F. in the presence of hydrogen and at temperature of about 900° F. at a pressure of about 500 p. s. i. g., the catalyst bed 11 is composed of a platinum catalyst which includes about 0.5% platinum, based on the total weight of catalyst, supported on alumina to which has been added about 2% by weight of silica to stabilize the alumina at elevated temperatures. This catalyst is generally in the form of short, approximately cylindrical pieces of a diameter of about $1/16''$ and of a length ranging from about $1/8''$ to about $1/2''$.

Although many changes can be made by those skilled in the art without departing from the scope of the invention, it is intended that all matter contained in the above description and appended claim and shown in the accompanying drawings shall be interpreted as illustrative and not limitative.

We claim:

A reactor vessel comprising a normally vertically disposed cylindrical shell having a refractory insulating lining covering the internal wall surface thereof and defining a reaction zone including a section adapted to house a bed of subdivided contact material, inlet means in the top of said vessel for passing reactant material to said reaction zone, outlet means in the bottom of said vessel for outlet of reacted material from said reaction zone, a flow impervious annular member united to the vessel wall positioned in the region of said inlet means and surrounding said inlet means, said annular member extending across said insulating lining, a light gauge impervious metal lining covering the portion of said insulating lining defining said bed housing section and extending upwardly to said annular member and united thereto, said metal lining formed of a plurality of similarly united sections, each of said sections having a channel-like cross section, said channel-like sections juxtaposed with their respective flanges extending inwardly to simulate folds therein to thereby provide for substantially unrestrained expansion and contraction of said metal lining, and a plate member of approximately triangular section united to said annular member and said sections and extending into the upper end of the space between said juxtaposed channel sections to seal said space to the flow of reactant material therethrough.

References Cited in the file of this patent
UNITED STATES PATENTS

| | | |
|---|---|---|
| 1,799,234 | Huff | Apr. 7, 1931 |
| 1,993,500 | Benner | Mar. 5, 1935 |
| 2,460,052 | Werner | Jan. 25, 1949 |
| 2,548,519 | Cummings | Apr. 10, 1951 |
| 2,657,121 | Rollins | Oct. 27, 1953 |